US012750129B2

(12) United States Patent
Tung

(10) Patent No.: US 12,750,129 B2
(45) Date of Patent: Sep. 29, 2026

(54) SIGNAL TRANSMISSION DEVICE

(71) Applicants: INVENTEC (PUDONG) TECHNOLOGY CORPORATION, Shanghai (CN); INVENTEC CORPORATION, Taipei City (TW)

(72) Inventor: Wei-Shin Tung, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 282 days.

(21) Appl. No.: 18/733,349

(22) Filed: Jun. 4, 2024

(65) Prior Publication Data

US 2025/0274191 A1 Aug. 28, 2025

(30) Foreign Application Priority Data

Feb. 28, 2024 (CN) ........................ 202410224287.X

(51) Int. Cl.
*H04B 7/185* (2006.01)

(52) U.S. Cl.
CPC ................................ *H04B 7/18513* (2013.01)

(58) Field of Classification Search
CPC .... H01Q 15/00; H01Q 15/0086; H01Q 15/14; H01Q 21/065; H04B 7/04013
See application file for complete search history.

(56) References Cited

U.S. PATENT DOCUMENTS

| | | | | |
|---|---|---|---|---|
| 11,444,387 | B2 * | 9/2022 | Achour | H01Q 13/28 |
| 12,388,495 | B2 * | 8/2025 | Çelik | H04W 28/0273 |
| 12,531,325 | B2 * | 1/2026 | Sekiguchi | H01Q 1/24 |
| 2024/0171224 | A1 * | 5/2024 | Jian | H04B 1/16 |
| 2024/0356217 | A1 * | 10/2024 | Zhang | H04B 7/15528 |

* cited by examiner

*Primary Examiner* — Hasan Islam
(74) *Attorney, Agent, or Firm* — Maschoff Brennan

(57) ABSTRACT

A signal transmission device comprises a plurality of signal transmission units, a sensing component and a controller. The plurality of signal transmission units are arranged into a surface array for receiving a transmission signal in a first direction and outputting at least a part of the transmission signal in a second direction, wherein the first direction and the second direction are associated with a current impedance distribution of the surface array. The sensing component is connected to the plurality of signal transmission units and is configured to obtain a signal strength of a feedback signal associated with the transmission signal. The controller is connected to the plurality of signal transmission units and the sensing component, and is configured to adjust the current impedance distribution according to the signal strength.

9 Claims, 5 Drawing Sheets

SIGNAL TRANSMISSION DEVICE

CROSS-REFERENCE TO RELATED APPLICATIONS

This non-provisional application claims priority under 35 U.S.C. § 119 (a) on Patent Application No(s). 202410224287.X filed in China on Feb. 28, 2024, the entire contents of which are hereby incorporated by reference.

BACKGROUND

1. Technical Field

This disclosure relates to a signal transmission device.

2. Related Art

In the signal transmission process, when there is an insurmountable obstacle (such as an object) located between the signal transmitter and the receiver, the signal is transmitted between the signal transmitter and the receiver via a non-line-of-sight path (NLOS). If the signal propagation environment is simple without a reflection path, the signal receiver may only receive a weak signal. Therefore, a Reconfigurable Intelligent Surface (RIS) device can be installed for the insurmountable obstacle interval (blind zone) between the signal transmitter and the receiver, and the construction of RIS creates a virtual line-of-sight path (LOS) for signal transmission, which may eliminate the impact of blind zone on signal transmission. However, current RIS devices need to use the entire system to determine the receiving source direction and the reflection direction, instead of dynamically adjusting the receiving source direction and the reflection direction in a simple way.

In other words, for determining the direction of the source signal and the direction of the reflected signal, the backend system needs to inform the RIS how to set the direction, which may cause communication delays and installation complexity.

SUMMARY

Accordingly, this disclosure provides a signal transmission device.

According to one or more embodiment of this disclosure, a signal transmission device comprises a plurality of signal transmission units, a sensing component and a controller. The plurality of signal transmission units are arranged into a surface array for receiving a transmission signal in a first direction and outputting at least a part of the transmission signal in a second direction, wherein the first direction and the second direction are associated with a current impedance distribution of the surface array. The sensing component is connected to the plurality of signal transmission units and is configured to obtain a signal strength of a feedback signal associated with the transmission signal. The controller is connected to the plurality of signal transmission units and the sensing component, and is configured to adjust the current impedance distribution according to the signal strength.

In view of the above description, the signal transmission device of the present disclosure may adjust the current impedance distribution of the surface array according to changes in signal strength in different directions by using the sensing component to measure the signal strength of the feedback signal in a specific direction. In this way, the RIS implemented by the signal transmission device of the present disclosure may directly and dynamically adjust the direction of the source signal and reflected signal of the RIS in an instant response manner, so as to produce reasonable signal coverage, and greatly increase the feasibility and ease of installation of RIS.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
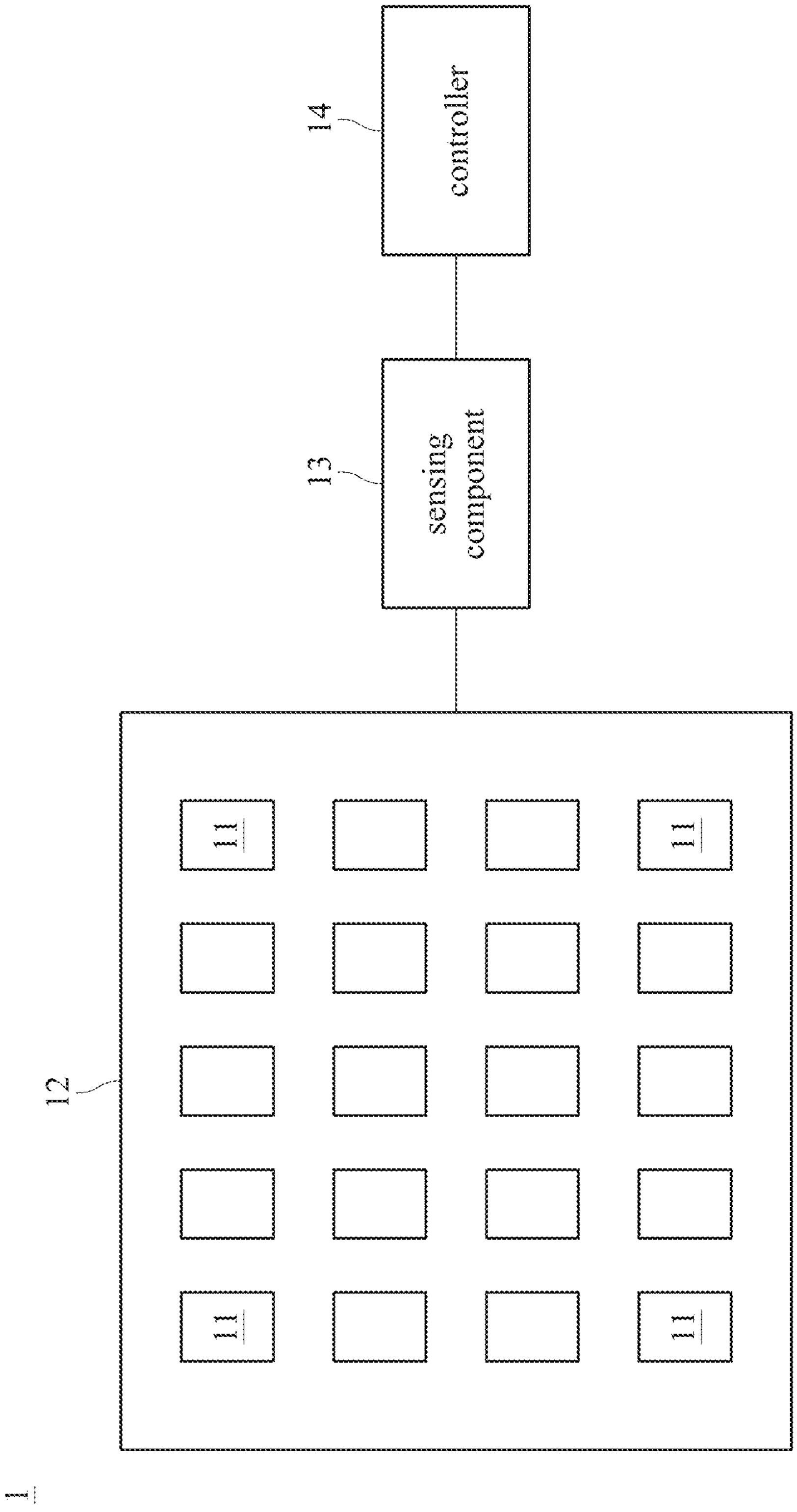
FIG. 1 is a schematic diagram of a signal transmission device according to an embodiment of the present disclosure.
Figure 2:
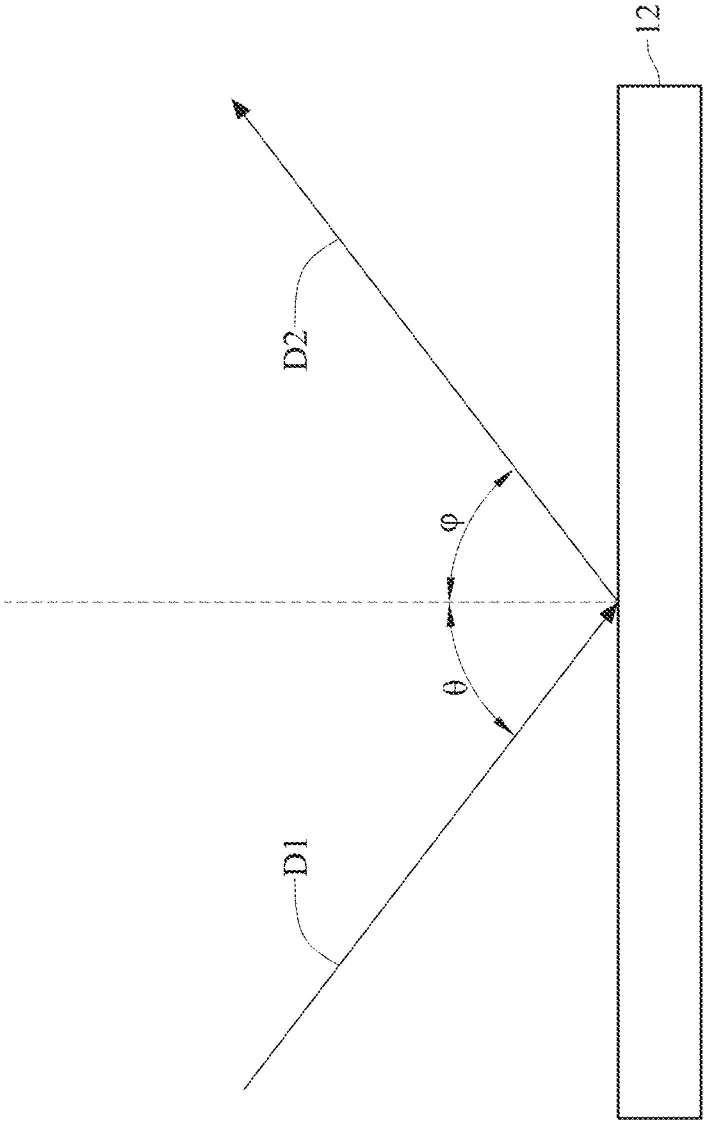
FIG. 2 is a schematic diagram of a surface array of a signal transmission device receiving and reflecting transmission signals according to an embodiment of the present disclosure.

Please refer to FIG. 1 and FIG. 2, FIG. 1 is a schematic diagram of a signal transmission device according to an embodiment of the present disclosure, FIG. 2 is a schematic diagram of a surface array of a signal transmission device receiving and reflecting transmission signals according to an embodiment of the present disclosure. As shown in FIG. 1, a signal transmission device 1 comprises a plurality of signal transmission units 11, a sensing component 13 and a controller 14. The plurality of signal transmission units 11 are arranged into a surface array 12 for receiving a transmission signal in a first direction D1 and outputting at least a part of the transmission signal in a second direction D2, wherein the first direction D1 and the second direction D2 are associated with a current impedance distribution of the surface array 12. The sensing component 13 is connected to the plurality of signal transmission units and is configured to obtain a signal strength of a feedback signal associated with the transmission signal. The controller 14 is connected to the plurality of signal transmission units 11 and the sensing component 13, and is configured to adjust the current impedance distribution according to the signal strength.

In the present embodiment, the surface array 12 formed by the arrangement of the plurality of signal transmission units 11 is a reconfigurable intelligent surface (RIS). The surface array 12 can be controlled to adjust the first direction D1 in which the transmission signal is received (ie, adjust the signal incident angle θ), and controlled to adjust the second direction D2 in which at least a part of the transmission signal is emitted (ie, adjust the signal reflection angle ϕ).

Figure 3:
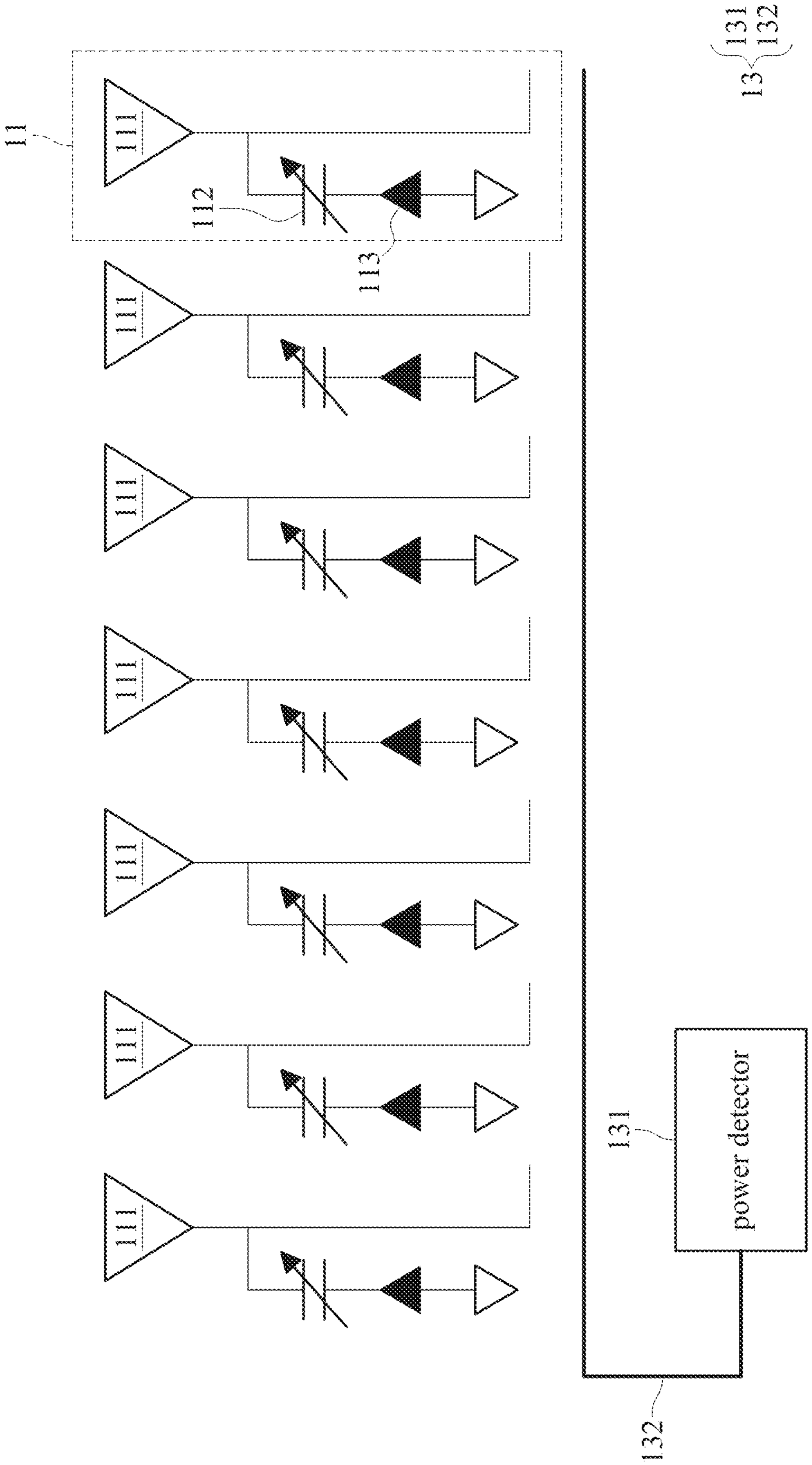
FIG. 3 is a circuit diagram of a plurality of signal transmission units and a sensing component of a signal transmission device according to an embodiment of the present disclosure.

Please refer to FIG. 3 which is a circuit diagram of a plurality of signal transmission units and a sensing component of a signal transmission device according to an embodiment of the present disclosure. Specifically, each of the plurality of signal transmission units 11 may include a radiator 111, a variable capacitor 112 and a voltage controller 113. The radiator 111 is configured to receive the transmission signal and output at least a part of the transmission signal. The variable capacitor 112 is connected to the controller 14 and the radiator 111 and is configured to be controlled by the controller 14 to form at least a part of the impedance distribution. In the present embodiment, the variable capacitor 112 is an impedance adjustment component, and the controller 14 is configured to control an operating voltage of the variable capacitor 112 through the respective voltage controllers 113 of the plurality of signal transmission units 11 to adjust the impedance distribution. The voltage controller 113 may be implemented through transistors for outputting different voltage values.

It should be noted that in other embodiments, the impedance adjustment component may be implemented by components other than the variable capacitor 112, and in addition to adjusting the impedance to ground by controlling the operating voltage, the impedance to ground may also be adjusted through other control mechanisms, such as by controlling the on or off of specific transistors. For example, the radiator 111 of the signal transmission unit 11 may be a metal sheet. By changing the operating voltage of the impedance adjustment component (variable capacitor 112), the impedance of the radiator 111 can be changed, so that the impedance distribution of the surface array 12 formed by the arrangement of a plurality of radiators 111 changes. Thereby, the incident angle and reflection angle of the transmission and reception signals of the surface array 12 can be adjusted.

In the present embodiment, the sensing component 13 may include a power detector 131 and a feedback line 132. The power detector 131 is configured to convert the feedback signal into an electrical signal and generate the signal strength according to the electrical signal. For example, the feedback line 132 may be electromagnetically coupled to the plurality of signal transmission units 11 and electrically connected to the power detector 131. Through this configuration, the signal transmission units 11 may receive the feedback signal corresponding to the direction of the transmission signal (the first direction D1 and the second direction D2), and transmit the feedback signal to the power detector 131 through the feedback line 132 so that the power detector 131 detects the signal strength corresponding to the direction of the current transmission signal (the first direction D1 and the second direction D2). It should be noted that the electrical connection between the signal transmission units 11 and the feedback line 132 is not limited to a wired connection or a wireless connection (coupling). Also, the power detector 131 and voltage controller 113 shown in FIG. 3 may be connected to the controller 14, so the power detector 131 may transmit the measured signal strength to the controller 14, and the controller 14 may adjust the operating voltage of the variable capacitor 112 through the voltage controller 113 to dynamically adjust the impedance distribution of the surface array 12.

Figure 4:
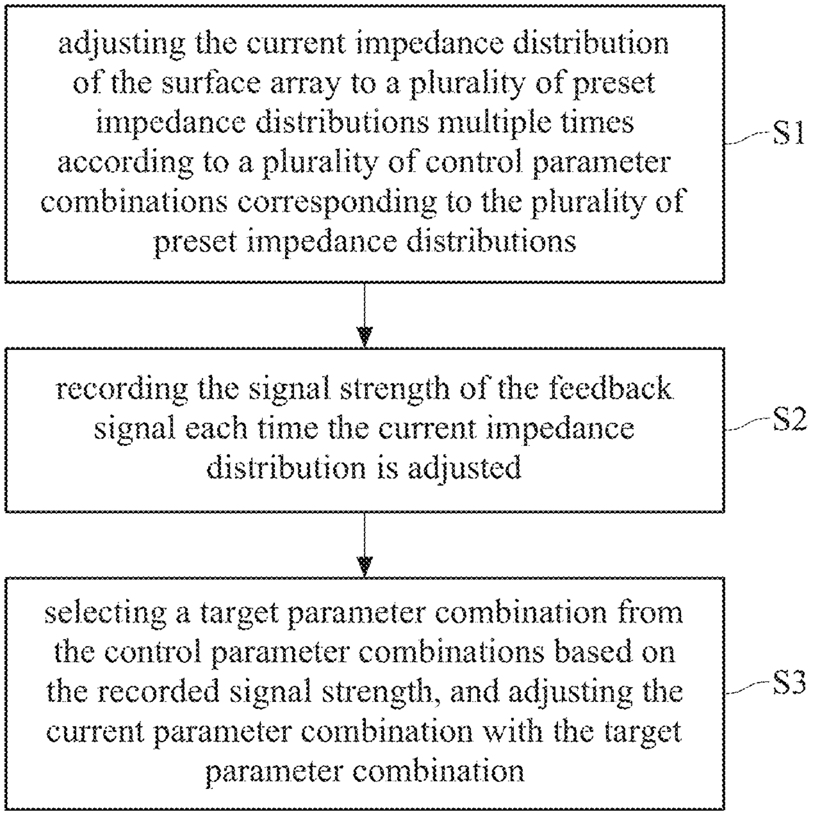
FIG. 4 is a flow chart of the dynamic operation of the signal transmission device according to an embodiment of the present disclosure.

Regarding the operation of the controller 14 to dynamically adjust the impedance distribution of the surface array 12, please refer to FIG. 4, which is a flow chart of the dynamic operation of the signal transmission device according to an embodiment of the present disclosure. As shown in FIG. 4, the controller of the signal transmission device may perform: step S1: adjusting the current impedance distribution of the surface array to a plurality of preset impedance distributions multiple times according to a plurality of control parameter combinations corresponding to the plurality of preset impedance distributions; step S2: recording the signal strength of the feedback signal each time the current impedance distribution is adjusted; and step S3: selecting a target parameter combination from the control parameter combinations based on the recorded signal strength, and adjusting the current parameter combination with the target parameter combination.

In step S1, the controller may adjust the current impedance distribution of the surface array to the plurality of preset impedance distributions multiple times according to the correspondence between the plurality of preset impedance distributions and the plurality of control parameter combinations stored in advance. Specifically, the plurality of control parameter combinations may be the operating voltage combinations of the plurality of variable capacitors 112 shown in FIG. 3. Please refer to the following Table 1. Table 1 exemplarily presents the operating voltage combinations of the plurality of variable capacitors 112 in FIG. 3. However, the present disclosure is not limited to the numerical examples in Table 1.

TABLE 1

| combination number | variable capacitor(1) | variable capacitor(2) | variable capacitor(3) | . . . | variable capacitor(N) |
|---|---|---|---|---|---|
| (A) | 0.5 V | 1 V | 1 V | . . . | 1 V |
| (B) | 0.5 V | 0.5 V | 1 V | . . . | 1 V |
| (C) | 0.5 V | 0.5 V | 0.5 V | . . . | 1 V |
| . . . | . . . | . . . | . . . | . . . | . . . |

According to Table 1, the controller may select the operating voltage combination of the plurality of variable capacitors corresponding to different combination numbers to adjust the current impedance distribution of the surface array, thereby changing the incident direction of the source signal received by the surface array and the reflection direction of the transmission signal. It should be noted that the variable capacitor may also be other types of impedance adjustment components, and the plurality of control parameter combinations may also be stored in the controller in a form similar to Table 1. In step S2, the controller may record the signal strength of the feedback signal each time the current impedance distribution is adjusted. For example, when the controller selects the operating voltage combination of combination number (A) to adjust the current impedance distribution, the signal strength of the feedback signal may be obtained through the sensing component and recorded. Here, the present disclosure does not intend to limit the form of data recording and storage. For example, data can be recorded or stored in the form of tables, parameter combinations, etc. Please refer to Table 2 below.

TABLE 2

| combination number | variable capacitor (1) | variable capacitor (2) | variable capacitor (3) | . . . | variable capacitor (N) | signal strength |
|---|---|---|---|---|---|---|
| (A) | 0.5 V | 1 V | 1 V | . . . | 1 V | $I_1$ |
| (B) | 0.5 V | 0.5 V | 1 V | . . . | 1 V | $I_2$ |
| (C) | 0.5 V | 0.5 V | 0.5 V | . . . | 1 V | $I_3$ |
| . . . | . . . | . . . | . . . | . . . | . . . | . . . |

Compared with Table 1, Table 2 also records the signal strength corresponding to the impedance distribution of each combination number. For example, assume $I_1>I_2>I_3$, wherein $I_1$, $I_2$, and $I_3$ respectively represent the intensity of the feedback signal in the direction corresponding to different incident/reflection angles. Then, in step S3, the controller may select a target parameter combination from a plurality of control parameter combinations according to the recorded signal strength, and adjust the current impedance distribution with the target parameter combination. Specifically, the controller may select the operating voltage combination corresponding to the highest feedback signal strength. Specifically, in this example with $I_1>I_2>I_3$, the controller may determine that there is a stronger signal source in the direction of the incident/reflection angle of the impedance distribution corresponding to the strength of the feedback signal $I_1$. Therefore, the controller may select a plurality of operating voltages of combination number (A) as the target parameter combination, and adjust the current impedance distribution accordingly. Similar to Table 1, Table 2 merely serves as an example, and the present application is not limited thereto.

To sum up, in the present embodiment, the controller of the signal transmission device may adjust the current impedance distribution to the plurality of preset impedance distributions multiple times according to the plurality of control parameter combinations and record the signal strength at each adjustment. Then, the controller may select a target parameter combination from the plurality of control parameter combinations according to the recorded signal strength, and adjust the current impedance distribution with the target parameter combination, wherein the value of the signal strength corresponding to the target parameter combination can be the maximum value.

Figure 5:
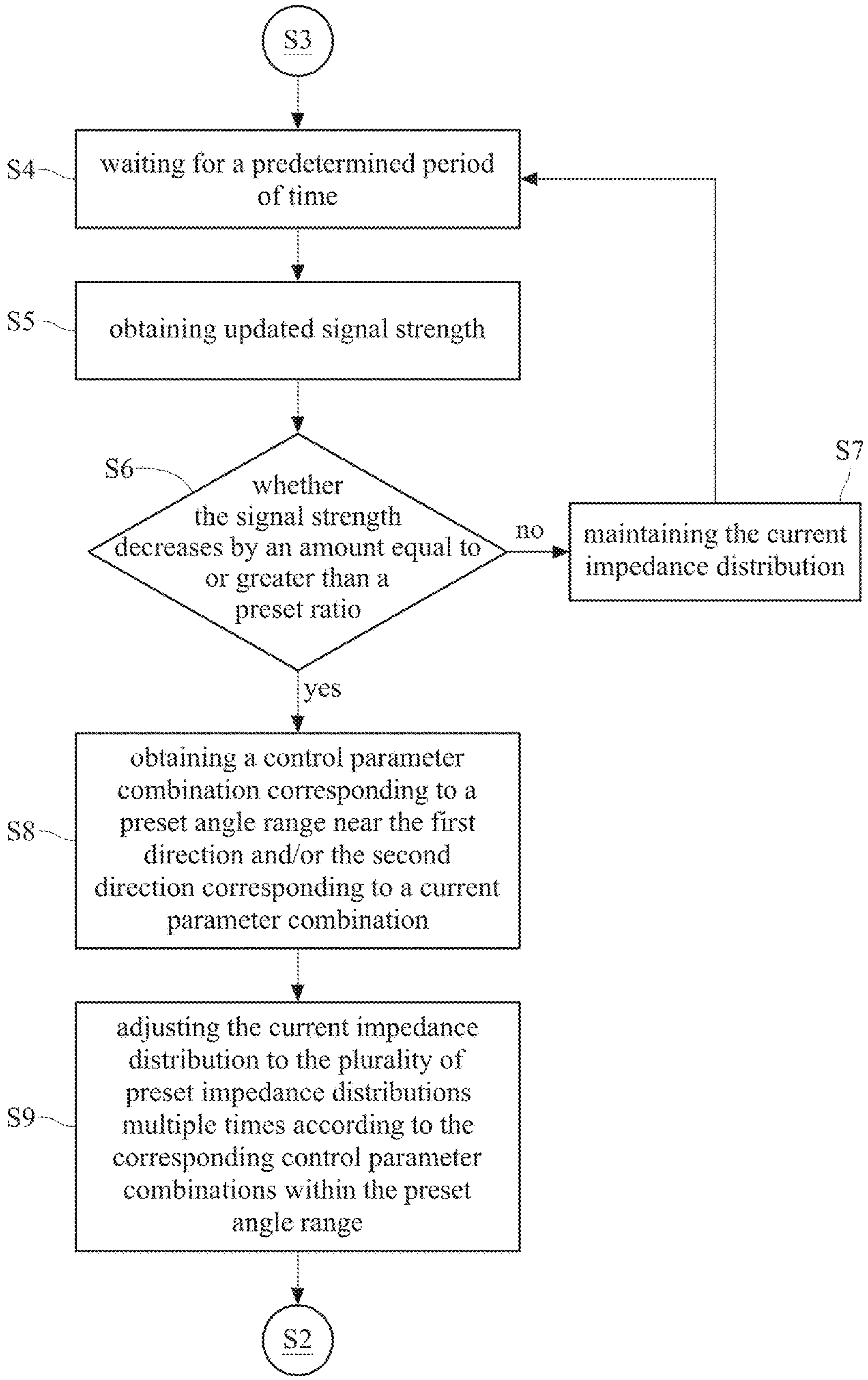
FIG. 5 is a flow chart of the dynamic operation of the signal transmission device according to another embodiment of the present disclosure.

Further, please refer to FIG. 5 along with FIG. 4, FIG. 5 is a flow chart of the dynamic operation of the signal transmission device according to another embodiment of the present disclosure. In the present embodiment, after step S3 of adjusting the current impedance distribution with the target parameter combination as shown in FIG. 4, the controller may further dynamically update the current impedance distribution under specific conditions. As shown in FIG. 5, the controller of the signal transmission device of the present embodiment, after step S3, may perform step S4: waiting for a predetermined period of time; step S5: obtaining updated signal strength; step S6: determining whether the signal strength decreases by an amount equal to or greater than a preset ratio; if the decrease in the signal strength does not reach the preset ratio, the controller may perform step S7: maintaining the current impedance distribution; if the decrease in the signal strength reaches the preset ratio, the controller may perform step S8: obtaining a control parameter combination corresponding to a preset angle range near the first direction and/or the second direction corresponding to a current parameter combination; and step S9: adjusting the current impedance distribution to the plurality of preset impedance distributions multiple times according to the corresponding control parameter combinations within the preset angle range, and step S2 may be performed again after step S9.

In the application scenario of the present disclosure, it might happen that the signal receiving end moves which makes the signal transmission capability of the signal transmission reduced. To this end, in steps S4 and S5, the controller may obtain the updated signal strength again after waiting for a predetermined period of time, and in step S6, the original signal strength and the updated signal strength are compared to determine whether a decrease in the signal strength reaches a preset ratio. The length of the predetermined period of time and the value of the preset ratio may be set in the operation logic of the controller in advance. When the decrease in the signal strength does not reach the preset ratio (for example, 50%), the controller may maintain the current impedance distribution (step S7), that is, no additional adjustment of the impedances of the plurality of signal transmission units is performed. It can be understood that, after the next predetermined period of time following step S7, the controller may again determine whether the decrease in the signal strength reaches the preset ratio, that is, the controller may return to perform step S4 after performing step S7.

On the other hand, in step S8, when the decrease in the signal strength reaches the preset ratio (for example, 50%), the controller may obtain a control parameter combination corresponding to a preset angle range near the first direction and/or the second direction corresponding to a current parameter combination. In step S9, the controller may adjust the current impedance distribution to the plurality of preset impedance distributions multiple times according to the corresponding control parameter combinations within the preset angle range. Please refer to Table 3 below for further explanation.

TABLE 3

| combination number | incident angle θ | reflection angle φ | variable capacitor (1) | variable capacitor (2) | variable capacitor (3) | . . . | variable capacitor (N) |
|---|---|---|---|---|---|---|---|
| (A) | 60 degrees | 60 degrees | 0.5 V | 1 V | 1 V | . . . | 1 V |
| (B) | 60 degrees | 75 degrees | 0.5 V | 0.5 V | 1 V | . . . | 1 V |
| (C) | 60 degrees | 45 degrees | 0.5 V | 0.5 V | 0.5 V | . . . | 1 V |
| . . . | . . . | . . . | . . . | . . . | . . . | . . . | . . . |

Please refer to Table 3. For example, the controller originally controlled the impedance distribution of the surface array with the operating voltage combination of combination number (A). That is, the angle of the first direction of signal incidence and the second direction of signal reflection corresponding to the current parameter combination of the surface array are 60 degrees and 60 degrees, respectively. Then, in step S6, the controller determines that a decrease in the signal strength of this angle combination has reached a preset ratio. In step S8, the controller may obtain the corresponding control parameter combination within a preset angle range (such as plus or minus 15 degrees) near the first direction and/or the second direction, that is, the operating voltage combination of the combination number (A), (B) and (C). In step S9, the controller may adjust the current impedance distribution according to the operating voltage combinations of combination numbers (A), (B), and (C). After step S9, the controller may return to perform step S2 again, which is recording the signal strength of the feedback signal again, and updating and obtaining a target parameter combination with a larger signal strength. In this way, when the signal strength drops by a certain percentage, the angles within the preset angle range of the original angle may be scanned without having to re-scan the entire angle range, thereby achieving the effect of dynamically updating the signal transmission direction with efficiency maintained. It should be noted that, similar to Table 1 and Table 2, the incident/reflection angle and operating voltage of the variable capacitor in Table 3 merely serves as examples, and the present disclosure is not limited thereto.

To sum up, in the present embodiment, based on the process of FIG. 3, the controller of the signal transmission device may further obtain updated signal strength through the sensing component again after adjusting the current impedance distribution with the target parameter combination for a predetermined period of time. When the updated signal strength decreases by an amount equal to or greater than a preset ratio, the current impedance distribution is adjusted multiple times to at least a part of the plurality of preset impedance distributions according to at least a part of the plurality of control parameter combinations. And each time the recorded signal strength is adjusted, another target parameter combination is selected from the plurality of control parameter combinations according to the recorded signal strength, and the current impedance distribution is adjusted with the other target parameter combination. Further, when the updated signal strength decreases by the amount equal to or greater than the preset ratio, the controller of the signal transmission device may adjust the current impedance distribution to at least a part of the plurality of preset impedance distributions multiple times according to the plurality of control parameter combinations corresponding to a preset angle range near the first direction and/or the second direction corresponding to a current parameter combination.

In the foregoing embodiments, Table 1 and Table 3 may be additionally constructed through a computing device and then provided to the controller, and Table 1 and Table 3 may be stored in the form of a beam table. The computing device may include one or more processing/control unit with data receiving, recording, computing, storage and output functions. The processing/control unit may be, for example, microcontrollers, central processing units, graphics processing unit, programmable logic controller or any combination of the above. Taking Table 1 as an example, the computing device may obtain the operating voltage nodes of the plurality of variable capacitors, and arrange and combine the operating voltage nodes of the plurality of variable capacitors to generate a plurality of operating voltage combinations corresponding to the plurality of combination numbers in Table 1. Taking Table 3 as an example, the computing device may perform data simulation or experimental data analysis on the impedance distribution of the surface array using the plurality of operating voltage combinations in Table 1, to obtain the relationship between the incident angle θ/reflection angle φ and the plurality of operating voltage combinations.

In view of the above description, the signal transmission device of the present disclosure may adjust the current impedance distribution of the surface array according to changes in signal strength in different directions by using the sensing component to measure the signal strength of the feedback signal in a specific direction. In this way, the RIS implemented by the signal transmission device of the present disclosure may directly and dynamically adjust the direction of the source signal and reflected signal of the RIS in an instant response manner, so as to produce reasonable signal coverage, and greatly increase the feasibility and ease of installation of RIS. In addition, the signal transmission device of the present disclosure may also regularly measure and update the signal strength of the feedback signal at a set period, and use the beam table to perform focused scanning within the preset angle range where the incident angle/reflection angle of the signal may deviate, thereby greatly improving the efficiency of dynamic scanning update.

In one or more embodiment of the present disclosure, the signal transmission device may be applied to a system composed of a 5G private network and a 5G small base station.

What is claimed is:

1. A signal transmission device, comprising:

a plurality of signal transmission units arranged into a surface array, and configured to receive a transmission signal in a first direction and output at least a part of the transmission signal in a second direction, wherein the first direction and the second direction are associated with a current impedance distribution of the surface array;

a sensing component connected to the plurality of signal transmission units, and configured to obtain a signal strength of a feedback signal associated with the transmission signal; and a controller connected to the plurality of signal transmission units and the sensing component, and configured to adjust the current impedance distribution according to the signal strength, wherein the controller stores a plurality of control parameter combinations respectively corresponding to a plurality of preset impedance distributions of the surface array, and the controller is configured to adjust the current impedance distribution to the plurality of preset impedance distributions multiple times according to the plurality of control parameter combinations, record the signal strength of the feedback signal each time the current impedance distribution is adjusted, select a target parameter combination from the plurality of control parameter combinations based on the signal strength that is recorded, and adjust the current impedance distribution with the target parameter combination.

2. The signal transmission device of claim 1, wherein a value of the signal strength corresponding to the target parameter combination is a maximum value.

3. The signal transmission device of claim 1, wherein the controller is further configured to obtain an updated signal strength through the sensing component again after adjusting the current impedance distribution with the target parameter combination for a predetermined period of time, and when the updated signal strength decreases by an amount equal to or greater than a preset ratio, the controller adjusts the current impedance distribution to at least a part of the plurality of preset impedance distributions multiple times according to at least a part of the plurality of control parameter combinations and records the signal strength each time of adjustment, and selects another target parameter combination from the plurality of control parameter combinations according to the signal strength that is recorded, and adjusts the current impedance distribution with said another target parameter combination.

4. The signal transmission device of claim 3, wherein the controller is configured to adjust the current impedance distribution to the at least a part of the plurality of preset impedance distributions multiple times according to the plurality of control parameter combinations corresponding to a preset angle range near the first direction and/or the second direction corresponding to a current parameter combination, when the updated signal strength decreases by the amount equal to or greater than the preset ratio.

5. The signal transmission device of claim 1, wherein each of the plurality of signal transmission units comprises:

a radiator configured to receive the transmission signal and output at least a part of the transmission signal; and an impedance adjustment component connected to the controller and the radiator, and configured to be controlled by the controller to form at least a part of the current impedance distribution.

6. The signal transmission device of claim 5, wherein the impedance adjustment component is a variable capacitor, and the controller is configured to control an operating voltage of the variable capacitor of each of the plurality of signal transmission units to adjust the current impedance distribution.

7. The signal transmission device of claim 1, wherein the sensing component comprises a power detector, and the power detector is configured to convert the feedback signal into an electrical signal and generate the signal strength according to the electrical signal.

8. The signal transmission device of claim 7, wherein the sensing component further comprises a feedback line, and the feedback line is coupled to the plurality of signal transmission units and connected to the power detector.

9. The signal transmission device of claim 1, wherein the surface array formed by arrangement of the plurality of signal transmission units is a reconfigurable intelligent surface.

* * * * *